(12) United States Patent
Pergantis et al.

(10) Patent No.: US 10,502,243 B2
(45) Date of Patent: Dec. 10, 2019

(54) HYDRAULIC SAFETY ADAPTER

(71) Applicant: United Technologies Corporation, Farmington, CT (US)

(72) Inventors: John Pergantis, Manchester, CT (US); Anthony Valenti, Wolcott, CT (US); Mark P. DePaolo, Middletown, CT (US); Michael J. Weidler, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 99 days.

(21) Appl. No.: 15/700,252

(22) Filed: Sep. 11, 2017

(65) Prior Publication Data

US 2019/0078593 A1    Mar. 14, 2019

(51) Int. Cl.
| | | |
|---|---|---|
| *F15B 20/00* | (2006.01) | |
| *F16P 1/02* | (2006.01) | |
| *F15B 15/20* | (2006.01) | |
| *F15B 15/14* | (2006.01) | |
| *F16P 1/00* | (2006.01) | |
| *F15B 15/26* | (2006.01) | |

(52) U.S. Cl.
CPC .......... *F15B 20/00* (2013.01); *F15B 15/1438* (2013.01); *F15B 15/20* (2013.01); *F16P 1/00* (2013.01); *F16P 1/02* (2013.01); *F15B 2015/267* (2013.01)

(58) Field of Classification Search
CPC .............. F15B 20/00; F15B 21/00; F16P 1/00
See application file for complete search history.

(56) References Cited

U.S. PATENT DOCUMENTS

| | | | | |
|---|---|---|---|---|
| 1,223,122 | A  * | 4/1917 | Subry | ........................ F04B 7/06 |
| | | | | 417/492 |
| 3,777,627 | A | 12/1973 | Goade | |
| 4,397,218 | A | 8/1983 | Spring | |
| 5,487,326 | A | 1/1996 | Owens | |
| 7,823,499 | B2 * | 11/2010 | De Volder | ............... F16J 15/43 |
| | | | | 92/162 R |
| 2011/0303084 | A1* | 12/2011 | Cappeller | ........... F15B 15/1428 |
| | | | | 92/169.1 |

(Continued)

FOREIGN PATENT DOCUMENTS

| | | |
|---|---|---|
| DE | 19750411 A1 | 7/1998 |
| GB | 1268371 A | 3/1972 |
| JP | S57200702 U | 12/1982 |

OTHER PUBLICATIONS

"Enerpac High-Tonnage Cylinders", www.enerpac.com, 2017.

(Continued)

*Primary Examiner* — Thomas E Lazo
(74) *Attorney, Agent, or Firm* — O'Shea Getz P.C.

(57) ABSTRACT

Aspects of the disclosure are directed to a safety adapter that is removably and replaceably securable to a hollow lock nut hydraulic cylinder that includes a threaded collar. The safety adapter may comprise a cylindrical sidewall having a distal axial end and proximate axial end, that at the distal axial end includes a top surface having a center through hole and at the proximate axial end includes a sidewall threaded surface on an interior surface of the cylindrical sidewall configured and arranged to engage with the threaded collar.

6 Claims, 4 Drawing Sheets

(56) References Cited

U.S. PATENT DOCUMENTS

| | | | | |
|---|---|---|---|---|
| 2012/0312160 A1* | 12/2012 | Middleton | .............. | F04B 13/00 92/169.1 |
| 2013/0247753 A1* | 9/2013 | Stanford | .................. | F16J 10/00 92/169.1 |
| 2015/0233396 A1* | 8/2015 | Cooper | ............... | F15B 15/1447 92/169.1 |
| 2016/0186745 A1* | 6/2016 | Roll | ........................ | F04B 19/22 92/169.1 |

OTHER PUBLICATIONS

"RCH-Series, Hollow Plunger Cylinders", www.enerpac.com, 2017.
EPO Search Report dated Feb. 13, 2019 for Application No. 18192897.9.

\* cited by examiner

HYDRAULIC SAFETY ADAPTER

BACKGROUND OF THE INVENTION

1. Technical Field

The present disclosure relates to hydraulic cylinders, more particularly, to a safety adapter for use with a hydraulic cylinder.

2. Background Information

Hollow hydraulic cylinders are used with rods that provide a pushing or pulling action during installation or removal of attached hardware. For example, hollow hydraulic cylinders may be used during the manufacture of gas turbine engines, such as those that power modern commercial and military aircraft.

The hollow hydraulic cylinder generally includes a center hole through which a tension rod passes. A nut is used to lock the tension rod in operational position. However, if the nut or tension rod fails it has the potential for a high energy release that may create a health and safety issue for anyone near the cylinder.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a safety adapter that is removably and replaceably securable to a hollow lock nut hydraulic cylinder that includes a threaded collar. The safety adapter may comprise a cylindrical sidewall having a distal axial end and proximate axial end, that at the distal axial end includes a top surface having a center through hole and at the proximate axial end includes a sidewall threaded surface on an interior surface of the cylindrical sidewall configured and arranged to engage with the threaded collar.

The safety adapter may comprise a cylindrical sidewall of aluminum.

The safety adapter may comprise synthetic fiber.

The cylindrical sidewall may include a central region that is tapered radially inward with respect to the distal axial end and the proximate axial end.

The distal axial end and the proximate axial end may taper bulbously outward from a central region of the cylindrical sidewall.

According to another aspect of the present disclosure, a safety adapter is provided. The safety adapter may comprise a cylindrical sidewall having a distal axial end and proximate axial end, that at the distal axial end includes a top surface having a center through hole and at the proximate axial end includes a sidewall threaded surface on an interior surface of the cylindrical sidewall.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
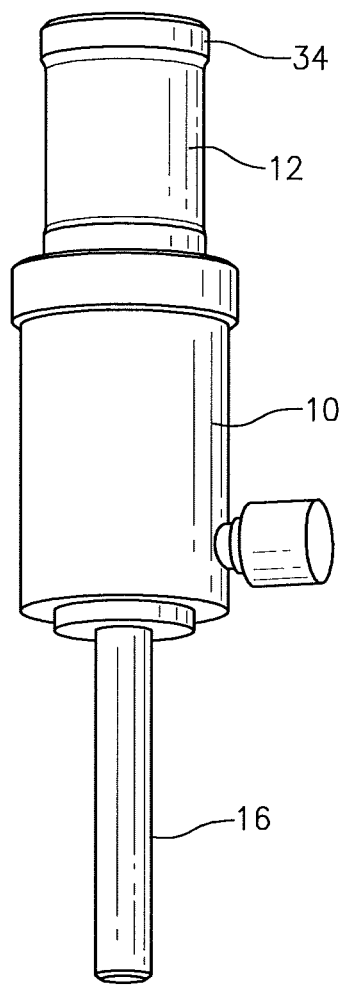
FIG. 1 is a pictorial illustration of a hollow hydraulic cylinder with an embodiment of the safety adapter secured thereto.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine.

Figure 2:
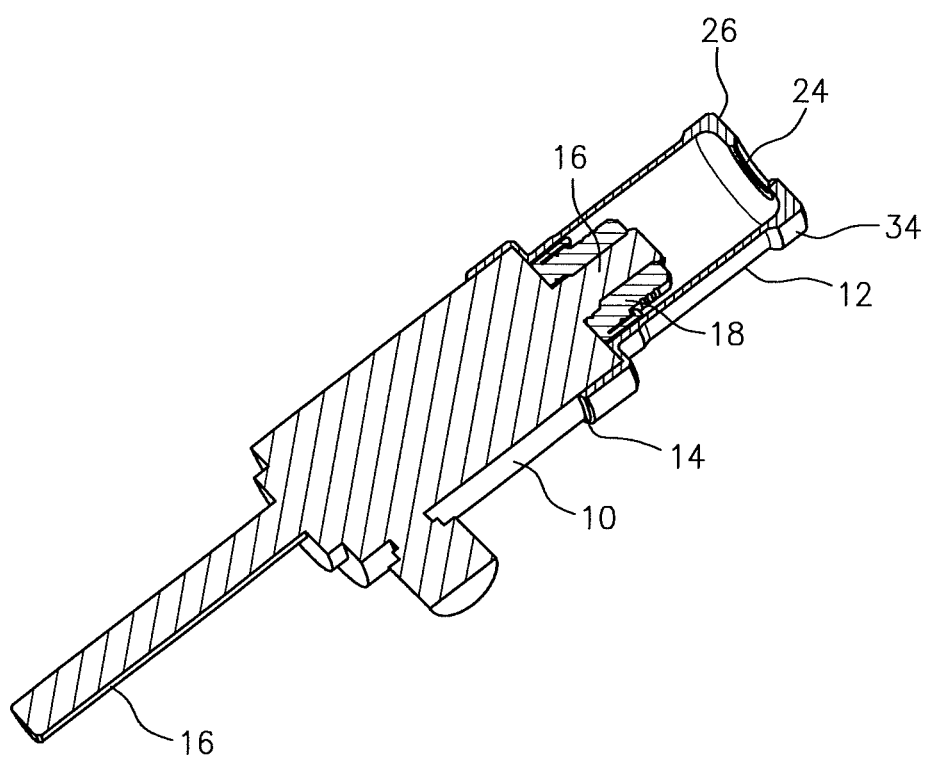
FIG. 2 is a simplified cross sectional illustration of the hollow hydraulic cylinder of FIG. 1 with an embodiment of the safety adapter attached thereto.

FIG. 1 is a pictorial illustration of a hollow lock nut hydraulic cylinder 10 with a safety adapter 12 secured thereto. FIG. 2 is a simplified cross sectional illustration of the hollow lock nut hydraulic cylinder 10 with the safety adapter 12 attached thereto. Referring to FIGS. 1 and 2, the hollow lock nut hydraulic cylinder 10 may include a threaded collar 14 onto which the safety adapter 12 may be threaded. The hollow lock nut hydraulic cylinder 10 includes a hydraulic rod 16 and a nut 18. Lock nut hydraulic cylinders such as hollow lock nut cylinder 10 are conventional in the art, and available from companies such as Enerpac (www.enerpac.com).

To protect a user if the nut 18 fails and disengages from the rod 16 or if the rod fails as pressure is applied to the cylinder, prior to pressure being applied to the cylinder 10 the safety adapter 12 is threaded onto the collar 14 of the cylinder. The safety adapter 12 captures the energy of an impact load from a released nut or rod of the hollow lock nut cylinder 10, thus protecting an adjacent user. The adapter 12 is removable and replaceable with respect to the hollow lock nut cylinder 10.

Figure 3:
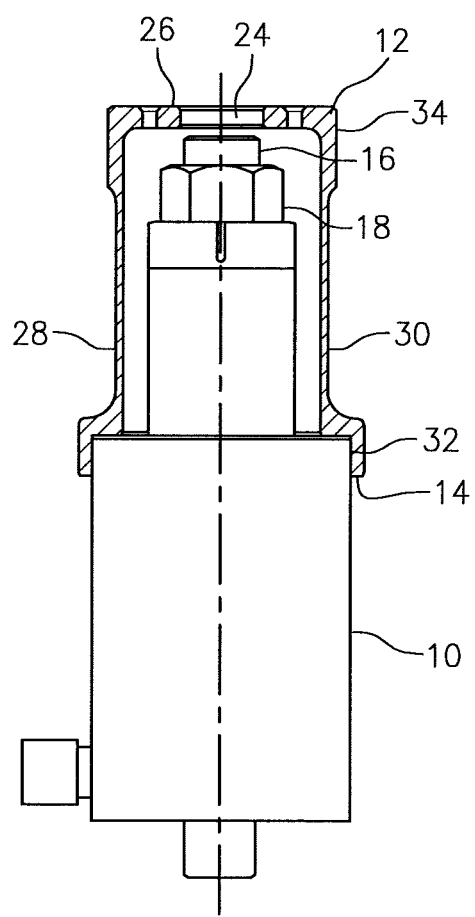
FIG. 3 is a cross sectional illustration of an embodiment of the safety adapter of FIGS. 1 and 2.

FIG. 3 is a cross sectional illustration of the hydraulic safety adapter 12, which may be generally cylindrical. However, it is contemplated that cross sectional shapes other than cylindrical may be used for the safety adapter. The safety adapter includes a center through hole 24 along a top surface 26 that allows the hydraulic rod 16 to pass, and first and second sidewalls 28, 30. The adapter 12 also includes a threaded base 32 that engages the threaded collar 14 of the hollow lock nut cylinder 10 (FIGS. 1 and 2). The axial length of the sidewalls are selected based upon the length of the cylinder rod. The thickness of the sidewalls 28, 30 is selected to ensure that the adapter 12 retains nut 18 and/or the rod 16 in the event of a failure. The safety adapter 12 may also include a textured exterior surface 34 that makes it easier for the user to thread the safety adapter 12 onto and off of the hollow lock nut cylinder 10.

The safety adapter 12 may be made of aluminum (e.g., Al 7075T6). Aluminum has a lower modulus of elasticity than steel and thereof may absorb the energy from a discharged nut or rod better than steel. It is contemplated that the safety adapter may also be made of fiber (synthetic, aramid, et cetera) or composite material, such as for example a KEL-VAR® fiber material.

Figure 4:
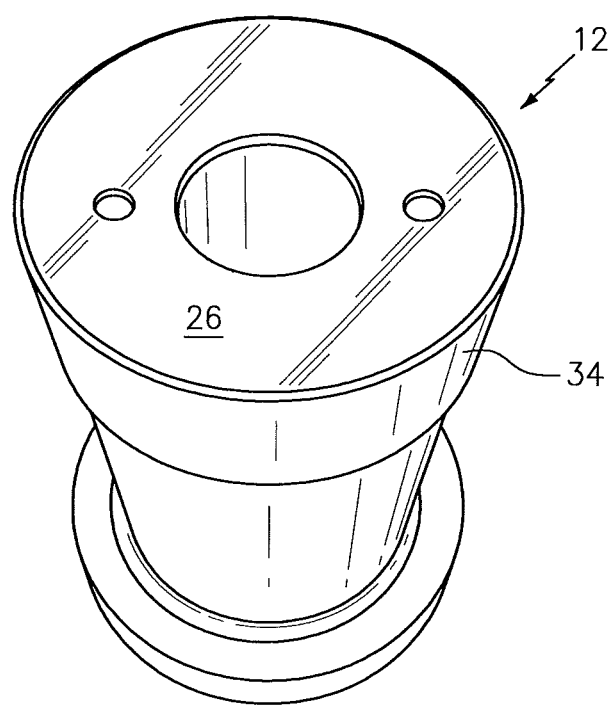
FIG. 4 is a pictorial illustration of the safety adapter of FIG. 3.

FIG. 4 is a pictorial illustration of the safety adapter of FIG. 3.

The sidewalls of the safety adapter may be tapered inward (e.g., in a radial central region) to save weight.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims It is therefore to be understood that within the scope of the appended claims, the disclosure may be practiced other than as specifically described. For that reason the appended claims should be studied to determine true scope and content.

What is claimed is:

1. A safety adapter that is removably and replaceably securable to a hollow lock nut hydraulic cylinder that includes a threaded collar, the safety adapter comprising:
   a cylindrical sidewall having a distal axial end and a proximate axial end, that at the distal axial end includes a top surface having a center through hole and at the proximate axial end includes a sidewall threaded surface on an interior surface of the cylindrical sidewall configured and arranged to engage with the threaded collar.

2. The safety adapter of claim 1, where the cylindrical sidewall is aluminum.

3. The safety adapter of claim 1, where the safety adapter is a synthetic fiber.

4. The safety adapter of claim 1, where the cylindrical sidewall has a central region that is tapered radially inward with respect to the distal axial end and the proximate axial end.

5. The safety adapter of claim 1, where distal axial end and the proximate axial end taper bulbously outward from a central region of the cylindrical sidewall.

6. A safety adapter, comprising:
   a cylindrical sidewall having a distal axial end and a proximate axial end, that at the distal axial end includes a top surface having a center through hole and at the proximate axial end includes a sidewall threaded surface on an interior surface of the cylindrical sidewall, where the cylindrical sidewall has a central region that is tapered radially inward with respect to the distal axial end and the proximate axial end.

* * * * *